United States Patent [19]

Kiefer et al.

[11] 4,454,587
[45] Jun. 12, 1984

[54] METHOD AND CIRCUIT ARRANGEMENT FOR DISCRIMINATING BETWEEN PULSES GENERATED BY ALPHA AND/OR BETA RADIATORS

[75] Inventors: Hans Kiefer, Eggenstein-Leop.; Hans-Gerd Röber; Bernd Reinhardt, both of Karlsruhe, all of Fed. Rep. of Germany

[73] Assignee: Kernforschungszentrum Karlsruhe Gesellschaft mit beschränkter Haftung, Karlsruhe, Fed. Rep. of Germany

[21] Appl. No.: 283,189

[22] Filed: Jul. 14, 1981

[30] Foreign Application Priority Data

Apr. 25, 1981 [EP] European Pat. Off. ......... 81103119

[51] Int. Cl.³ ............................................. G01T 1/15
[52] U.S. Cl. ................................... 364/527; 364/486; 250/385
[58] Field of Search ................. 364/481, 486, 527; 250/385, 388

[56] References Cited

U.S. PATENT DOCUMENTS

| | | | |
|---|---|---|---|
| 3,486,025 | 12/1969 | Brinkerhoff et al. | 364/527 X |
| 3,578,960 | 5/1971 | Georgi et al. | 364/527 |
| 3,638,000 | 1/1972 | Franco et al. | 364/527 |
| 3,717,753 | 2/1973 | Thomas | 364/486 X |
| 3,872,287 | 3/1975 | Koeman | 364/486 X |
| 3,906,377 | 9/1975 | Harris | 364/486 X |
| 4,228,512 | 10/1980 | Thompson et al. | 364/527 |

Primary Examiner—Edward J. Wise
Attorney, Agent, or Firm—Spencer & Frank

[57] ABSTRACT

Alpha and beta particles containing samples are detected to generate detector pulses wherein the leading edge of the pulses rise particle specifically almost constantly during a predetermined time with the slope of the pulses generated by alpha particles being substantially greater than the slope of the pulses generated by the beta particles. This physical phenomenon which is substantially independent of the energy of the particles is utilized for discrimination to determine which type of particle produced the pulse.

The linear starting region of the leading edge of the detector pulse is time discriminated in the nanosecond range. During the time given by the time discrimination, the detector pulses of alpha particles reach substantially higher amplitude values than the detector pulses generated by beta particles. The amplitude of the time discriminated detector pulse is determined by amplitude discrimination and is converted to trigger pulses which trigger a first counter for unequivocal alpha events or a second counter for unequivocal beta events. The very small portion of the detector pulses, whose amplitude obtained by time discrimination cannot be unequivocally associated with alpha or beta events, cause a third counter to be triggered which indicates the quality of the measurement.

10 Claims, 4 Drawing Figures

METHOD AND CIRCUIT ARRANGEMENT FOR DISCRIMINATING BETWEEN PULSES GENERATED BY ALPHA AND/OR BETA RADIATORS

BACKGROUND OF THE INVENTION

The present invention relates to a method and a circuit arrangement for discriminating between pulses generated by alpha and/or beta radiators in a detector. More particularly, the present invention relates to a method and circuit arrangement for discriminating between pulses generated in a radiation detector by alpha and/or beta radiation sources wherein the leading edges of the generated pulses rise particle specifically almost constantly during a predetermined initial time period in the nanosecond range and the slope of pulses generated by alpha particles is substantially greater than the slope of the pulses generated by beta particles.

U.S. application Ser. No. 230,505, filed February 2nd, 1981, now U.S. Pat. No. 4,400,621, by Hans Kiefer et al, the subject matter of which is incorporated herein by reference, discloses a detector for alpha and/or beta particles including a proportional counting tube with series-connected amplifier, which generates detector pulses whose leading edges linearly increase in a first approximation in a time period within the nanosecond range, e.g., the first 50 nanoseconds, and simultaneously exhibit greatly different slopes for alpha and beta pulses. This physical phenomenon regarding these differing slopes for alpha and beta particles is substantially independent of the energy of the particles and can be used for discrimination.

It is the object of the present invention to provide a method, and a circuit arrangement for implementing this method, so as to make it possible to unequivocally identify the detector pulses emitted at the output of a detector as alpha or beta pulses, independently of the pulse height determined by the particle energy.

SUMMARY OF THE INVENTION

In accordance with the present invention, a method is provided for discriminating between alpha and beta particle-produced detector pulses having leading edges which rise in a starting region of known duration, which lies in the nanosecond range, in a particle specific almost constant manner and with the slope $\alpha$ of these leading edges of the pulses generated by alpha particles being substantially greater than the slope $\beta$ of the leading edges of pulses generated by beta particles, which method includes both time discrimination and amplitude discrimination of the detected pulses. In general, initially all detector-generated pulses are subjected to an amplitude discrimination and those pulses whose amplitude falls within a first range are evaluated as beta events while those pulses whose amplitude exceeds this range are subjected to a time discrimination followed by a further amplitude discrimination to determine whether these latter pulses were caused by alpha or beta particles. That is, the linear starting region of the leading edge of each latter type detector pulse is time discriminated in the nanosecond range. During the time given by the time discrimination of this linear portion, the detector pulses of alpha particles reach substantially higher amplitude values than the detector pulses generated by beta particles. The amplitude of the time-discriminated detector pulse is determined by amplitude discrimination and is converted to trigger pulses which trigger a first counter for unequivocal alpha events or a second counter for unequivocal beta events. For the very small portion of the detector pulses, whose amplitude obtained by time discrimination cannot be unequivocally associated with alpha or beta events, a third counter is triggered which indicates the quality of the measurement.

More specifically, according to the present invention, first, second, third and fourth successively higher threshold values are established and each pulse whose maximum amplitude falls between the first and second threshold values is evaluated as an unequivocal beta signal; the amplitude ($A_\alpha$, $A_\beta$) of each detector pulse which exceeds the predetermined second threshold value is then measured during a predetermined constant time period which lies in the region of almost constant rise ($\alpha$, $\beta$) of its leading edge (time discrimination); and the signal amplitudes ($A_\alpha$, $A_\beta$) of the detector pulses, as measured by time discrimination, are evaluated by the use of amplitude discrimination by comparing same with the plurality of threshold values to effect the following associations of the detector pulses;

(1) pulse amplitudes (A) above the highest predetermined fourth threshold value are evaluated as unequivocal alpha signals;

(2) pulse amplitudes (A) above the second threshold value and below the third threshold value are evaluated as unequivocal beta signals; and (3) pulse amplitudes (A) above the third threshold value and below the fourth threshold value are allocated to alpha or beta pulses and are evaluated as the quality which constitutes the error quota of the measurement.

The advantages realized with the present invention are, in particular, that a predetermined detection limit is reached in a substantially shorter period of measuring, or that with an unshortened measuring period, the realizable detection sensitivity is much greater; that particularly for alpha-beta mixed samples, the measuring error for the alpha pulse rate is substantially reduced; that the time resolution capability is substantially increased; and that the separation of alpha and beta pulses can be effected with greater accuracy.

DETAILED DESCRIPTION OF THE PREFERRED EMBODIMENTS

Figure 1:
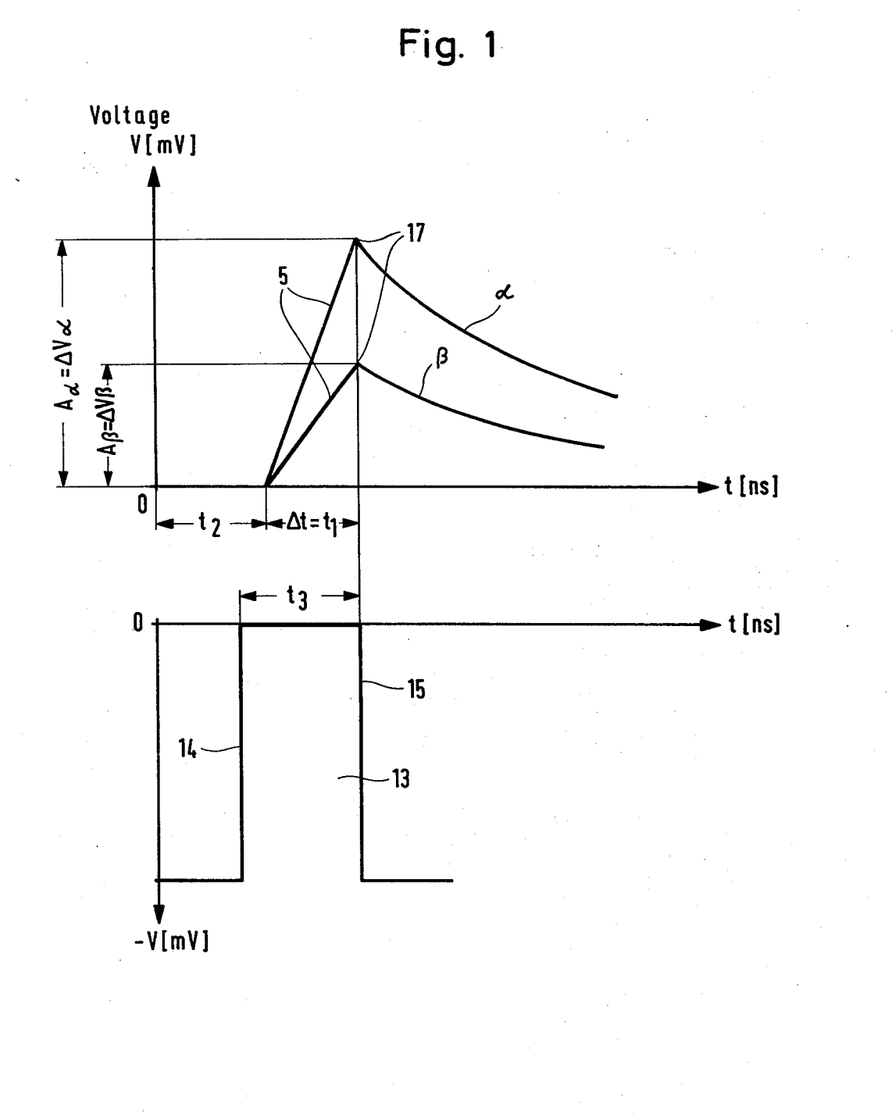
FIG. 1 shows a time-discriminated alpha pulse and a beta pulse with the leading edges being shown during the first approximately 20–30 nanoseconds, and a gating clock pulse which controls the time discrimination used according to the method of the present invention.

During the first 20 to 30 nanoseconds, the leading edges of alpha and beta pulses are almost linear and have greatly different slopes $\alpha$ and $\beta$. In particular, in this region, the rise $V_\alpha$ of an alpha pulse is approximately twice as great as the rise $V_\beta$ of a beta pulse. This relationship is shown in FIG. 1 for the first 20 ns=$t_1$ of the pulses. During the later course of the pulses, there may be a substantial approximation with respect to the steepness of the rise. The use of the difference quotients $\Delta V_\alpha/\Delta t$ and $\Delta V_\beta/\Delta t$ as a criterion for discrimination is thus possible only during the first 20 to 30 nanoseconds.

In the method according to the invention, there is therefore made a corresponding time discrimination of the detector pulses. During the given constant time period $t_1$ of the time discrimination, the alpha and beta pulses reach greatly differing amplitudes A, namely, $\Delta V_\alpha \approx 2\Delta V_\beta$, so that by means of an amplitude discrimination subsequent to the time discrimination, a great majority of the detector pulses can be identified unequivocally as alpha or beta pulses. The remainder of a few percent of events cannot be unequivocally allocated and is counted as an indication of the "quality" of the measurement, i.e., the error quota of the measurement.

Figure 2:
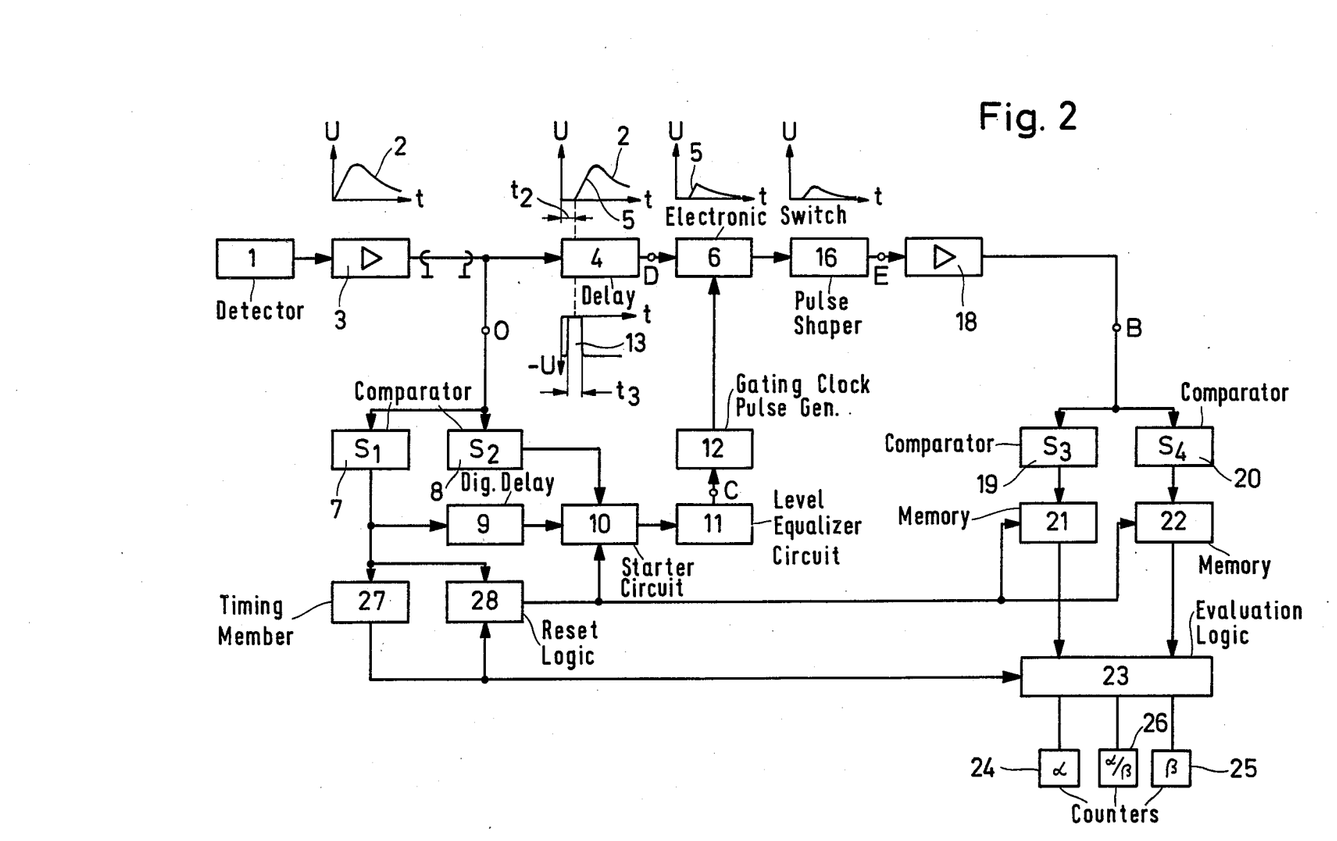
FIG. 2 is a block circuit diagram for a pulse discriminator circuit according to the preferred embodiment of the invention for implementing the method according to the invention.

Turning now to FIG. 2, which is a block circuit diagram for a discriminator for implementing the method, there is shown a detector 1, for the simultaneous measuring of alpha and/or beta particles, and a subsequently-connected amplifier 3, preferably integrated into the detector 1, for producing detector pulses 2 of the type discussed above. Such a detector 1 with an integrated amplifier 3 is disclosed in the above-identified U.S. application Ser. No. 230,505 now U.S. Pat. No. 4,400,621. In the detector arrangement disclosed in that application, the amplifier 3 has an output impedance of 50 ohm which has the advantage that the detector can be connected, by means of a 50 ohm coaxial cable to the subsequent circuitry. In any case, the output of the detector 1, 3 is connected via a delay line 4 which delays the detector pulse 2 by a predetermined time period $t_2$, to an electronic switch 6 which interrupts the rise of the leading edge 5 of the detector pulse 2 after a predetermined time $t_1$ set for the time discrimination.

The output O of the detector 1, 3 is connected to the input of a voltage comparator 7 which has a predetermined first threshold value $S_1$ and to the input of a second comparator 8 which has a predetermined second threshold value $S_2$ which is greater than the threshold value $S_1$.

The output of the comparator 7 is connected, via a digital delay member 9, with one input of a starter circuit 10. The output of the comparator 8 is connected directly with an input of the starter circuit 10 and triggers it only if the amplitude A of the detector pulse 2 exceeds the second threshold value $S_2$.

The output of the starter circuit 10 is connected to a level equalizer circuit 11 which converts a change in its input signal from "0" to "1" to a change in voltage from 0 to −5 volt. Connected to the output of the level equalizer circuit 11 is a gating clock pulse generator 12 which generates gating clock pulses 13 of a predetermined, constant pulse width $t_3$ which lies in the nanosecond range. In turn, the output of the gating clock pulse generator 12 is connected with the control input of the electronic switch 6 which is then switched through by the gating clock pulse 13 during the period $t_1$.

As is best shown in FIG. 1, the leading edge 14 of the gating clock pulse 13 lies directly before the end of the time delay period $t_2$ for the detector pulse 2 which delay period is determined by the time delays of the components required for signal processing and is set by the delay line 4. The electronic switch 6 is blocked or closed by the trailing edge 15 of the gating clock pulse 13. The trailing edge 15 thus also determines the end of the time period $t_1$ provided for time discrimination and stops the rise of the leading edge 5 of the detector pulses 2 at an amplitude value $A_\alpha$ or $A_\beta$.

The output of the electronic switch 6 is connected to a pulse shaper 16 which converts the signal voltages corresponding to the amplitudes $A_\alpha$, $A_\beta$ of the respective time-discriminated detector pulses 2 into an electrical charge for a capacitor and expands in time the peak-shaped maximum 17 of the amplitudes $A_\alpha$, $A_\beta$ obtained by the time discrimination.

The output of the pulse shaper 16 is connected, via an amplifier 18, to the input of a comparator 19 which has a predetermined third threshold value $S_3$ which is greater than $S_2$, and to the input of a comparator 20 which has a predetermined fourth threshold value $S_4$ which is greater than $S_3$. The respective inverting output of each of the comparators 19 and 20 is connected to respective memories 21 and 22 whose outputs are connected to an evaluation logic circuit 23 which sorts the time and amplitude discriminated detector pulses into alpha signals, beta signals and alpha or beta signals. The evaluation logic circuit 23 is provided with three outputs connected to a counter 24 for indicating unequivocal alpha signals, a counter 25 for indicating unequivocal beta signals and a counter 26 for indicating alpha or beta signals.

Also connected with the evaluation logic circuit 23 is the output of a timing member 27 whose input is connected to the inverting output of the comparator 7. At the end of the measuring period, the timing member 27 generates a read-out pulse for reading the content of the memory 21 or of the memory 22 via the evaluation logic circuit 23 into one of the counters 24, 25, 26. Moreover, the inverting output of the comparator 7 is connected to a first input of a reset logic circuit 28 whose second input is connected with the output of the timing member 27 and whose output is connected with the reset inputs of the starter circuit 10 and the memories 21, 22.

Figure 3:
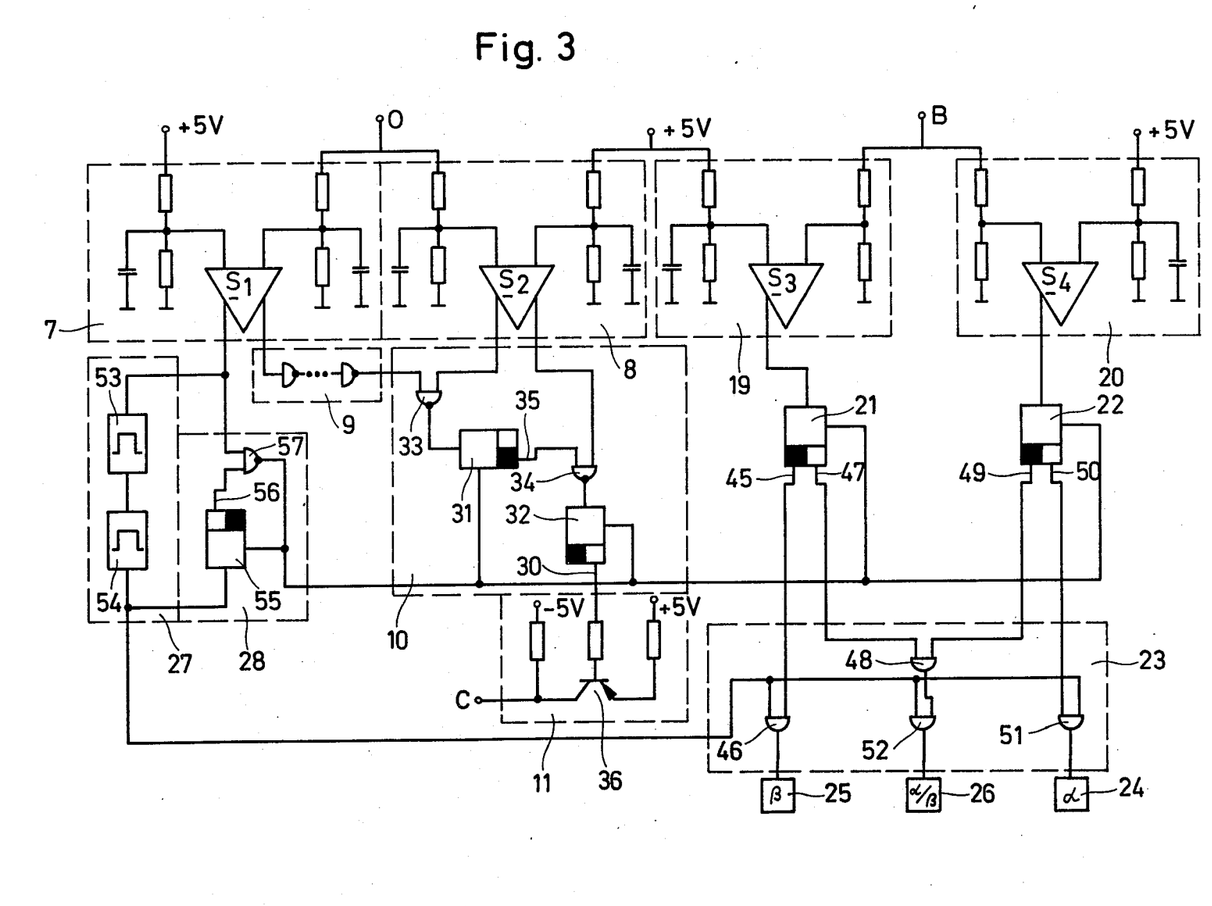
FIG. 3 is a circuit diagram showing the comparators, memories, starter circuit, evaluation logic and reset logic of the embodiment of FIG. 2.

Referring now to FIG. 3, there is shown the circuit diagram for the comparators 7, 8, 19 and 20, the memories 21 and 22, the starter circuit 10, the evaluation logic circuit 23, the timing circuit 27, and the reset logic circuit 28 of FIG. 2.

As indicated above, the starter circuit 10 generates a signal at its output 30 which triggers the level equalizer circuit 11 only if the signal amplitudes $A_\alpha$, $A_\beta$ exceed the second threshold value $S_2$ of the comparator 8. As shown in FIG. 3, the starter circuit 10 includes a bistable flip stage 31, a bistable flip stage 32, a NAND gate 33, and a NAND gate 34. The NAND gate 33 has its first input connected to the output of the digital delay member 9, its second input connected to the inverting output of the comparator 8, and its output connected to the input of bistable flip stage 31, whose noninverting output 35 is connected to a first input of the NAND gate 34. The second input of the NAND gate 34 is connected with the noninverting output of the comparator 8, while the output of the NAND gate 34 is connected to the input of bistable flip stage 32. The inverting output 30 of the bistable flip stage 33 is connected to the input of level equalizer circuit 11.

The level equalizer circuit 11 essentially comprises a pnp transistor 36 whose base is connected via a resistor to the output 30 of the starter circuit 10, whose emitter is connected to a positive voltage of 5 volts and whose collector to a negative voltage of equal magnitude—i.e., −5 volts.

Figure 4:
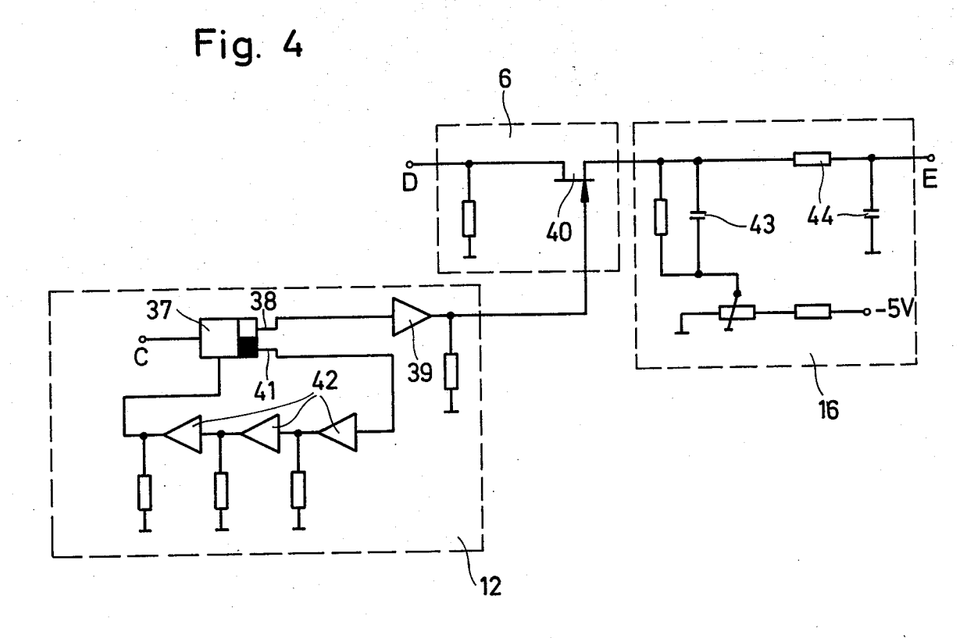
FIG. 4 is a circuit diagram for the gating clock pulse generator, the electronic switch and the pulse shaper or integrator of the embodiment of FIG. 2.

The output of the level equalizer circuit 11 is connected, via terminal C of the circuit, with the input of a bistable flip stage 37 of the gating clock pulse generator 12 shown in FIG. 4. As further shown in FIG. 4, the inverting output 38 of the flip stage 37 is connected, via a driver stage 39, to the control electrode of the electronic switch 6 which essentially comprises a field effect transistor 40. The noninverting output 41 of the bistable flip stage 37 is connected back to its reset input via a delay member 42 which determines the gating or open period $t_3$ of the field effect transistor 40.

In operation of this portion of the circuit, the descending edge of the control signal generated by the level equalizer circuit 11 triggers the bistable flip stage 37 whose inverting output 38 switches from −5 volt to 0 volt and thus generates the leading edge 14 of the gating clock pulse 13 shown in FIG. 1. At the same time, the noninverting output 41 of flip stage 37 goes from 0 volt to −5 volt. This signal is delayed by the delay member 42 by the time $t_3$ and is returned to the reset input where it generates the trailing edge 15 of the gating clock pulse 13 which determines the open time $t_3$ of the electronic switch 6.

A part of the leading edge 5 of the detector pulse 2 arriving at point D of the circuit, which part has been limited by the opening period $t_3$ (time discrimination) of the electronic switch 6, reaches the pulse shaper circuit 16 whose capacitor 43 is charged during the period $t_3$ and then discharges until the beginning of the next measuring cycle. A subsequently connected integrating member 44 produces a time expansion of the peak-shaped maximum 17 (FIG. 1) of the pulse amplitudes $A_\alpha$, $A_\beta$ obtained by time discrimination, whereupon these amplitudes are transmitted, via point E of the circuit, the amplifier 18 (FIG. 2) and point B of the circuit, to the portion of the circuit arrangement which performs the additional amplitude discrimination.

Referring again to FIG. 3, the signals arriving at point or terminal B of the circuit are fed to the comparators 19 and 20 whose inverting outputs are connected to the inputs of the memories 21 and 22, respectively, which are each designed as bistable flip stages.

The noninverting output 45 of the memory, or bistable flip stage 21, is connected to a first input of an AND gate 46 which, together with further AND gates 48, 51 and 52, constitute the evaluation logic circuit 23. The inverting output 47 of memory 21 is connected to a first input of the AND gate 48 whose second input is connected to the noninverting output 49 of the memory 22. The inverting output 50 of the memory 22 is connected to a first input of the AND gate 51. Finally, the output of the AND gate 48 is connected to a first input of the AND gate 52, and the second input of each of the AND gates 46, 51, and 52 is connected to the output of the timing member 27.

The output of the AND gate 46 is connected to the counter 25 which counts the beta events, the output of the AND gate 51 is connected to the counter 24 which counts the alpha events, and the output of the AND gate 52 is connected to the counter 26 which counts alpha and beta events that cannot be associated unequivocally to either the alpha or the beta events.

The inverting output of the comparator 7 is connected to the series connection of a first monostable multivibrator 53 and a second monostable multivibrator 54; the two multivibrators together form the timing member 27. The output of the timing member 27 is connected to the input of a bistable flip stage 55 whose inverting output 56 is connected to a first input of a NAND gate 57. The second input of the NAND gate 57 is connected to the inverting output of the comparator 7. The output of the NAND gate 57 which constitutes the output of the reset logic circuit 28, is connected to the reset inputs of each of bistable flip stages or memories 55, 31, 32, 21, 22.

Depending on the signal amplitude A of the detector pulses 2, there exist different possibilities of processing the signals.

$$S_1 < A < S_2$$

If the amplitude A of the detector pulse 2 exceeds the first threshold value $S_1$ but does not reach the second threshold value $S_2$, the noninverting output of the comparator 7, and thus, the first input of the NAND gate 33, is set from "0" to "1". The second input of the NAND gate 33, which is connected with the inverting output of the comparator 8, remains at "1" so that the output of the NAND gate 33 and, thus, the input of the bistable flip stage 31 and its noninverting output change from "1" to "0".

The first input of the NAND gate 34 thus goes to "0", the second input remains at "0" and the output remains at "1" so that the inverting output of the flip stage or memory 32 remains at "0" and the starter circuit 10 does not initiate a measuring process with time and amplitude discrimination.

The inverting output of the comparator 7 simultaneously changes from "1" to "0". The descending edge of this output signal actuates the first monostable multivibrator 53 and the latter, with a time delay, activates the second monostable multivibrator 54 of the timing member 27 whose output is connected to the first input of the AND gate 46 of the evaluation logic 23. The second input of the AND gate 46, which is connected to the noninverting output 45 of memory 21, is at "1" so that the "1" signal from the timing member 27 gives a counting pulse exclusively to the counter 25 for beta signals which is connected to the AND gate 46.

$$A > S_2$$

If the amplitude A of the detector signal 2 exceeds the first threshold value $S_1$ and the second threshold value $S_2$, the noninverting input of the comparator 8 and, thus, also the second input of the NAND gate 34 change from "0" to "1". The first input of the NAND gate 34 is already at "1" so that the output of NAND gate 34 goes from "1" to "0". The descending edge of this output signal sets the bistable flip stage or memory 32, and the output 30 of the starter circuit 10 changes from "0" to "1", thus providing a trigger pulse.

The level equalizer circuit 11 converts the trigger pulse of the starter circuit 10 to a voltage change from 0 volt to −5 volt. This descending edge sets the bistable flip stage 37 (gating pulse generator 12) which operates with an operating voltage of 0 volt and −5 volt. The inverting output 38 of flip stage 37 changes from −5 volt to 0 volt and generates the leading edge 14 of the gating clock pulse 13 which opens the switch 6 (see FIG. 1). After a time period $t_3$ of about 30 ns as determined by the delay member 42, the noninverting output 41 sets the flip stage 41 back. This generates the trailing edge 15 of the gating clock pulse 13 which closes the switch 6. The time discriminated detector signal is then amplitude discriminated by comparators 19 and 20 to determine its amplitude.

The following cases are possible here:

$S_2 < A < S_3$—unequivocal beta signal

The amplitude A of the detector pulse 2 is greater than the threshold values $S_1$ and $S_2$ so that time discrimination is actuated (see $A > S_2$). Since, however, the threshold valve $S_3$ is not reached, the outputs 45, 47 and 49, 50 of the memories 21 and 22 remain unchanged. Only the first input of the AND gate 46 of the evaluation logic circuit 23, which input is connected to the noninverting output of the memory 21, is at "1", so that the "1" signal of the timing member 27 sets only the output of the first AND gate 46 to "1" and the counter 25 counts a beta signal.

$S_3 < A < S_4$—alpha or beta signal

As explained under $A > S_2$, a time discrimination is actuated. The inverting output of the comparator 19 and the noninverting output 45 of the memory 21 go from "1" to "0", and the inverting output 47 of the memory 21 changes from "0" to "1". At the memory 22, the noninverting output 49 remains at "1" and the inverting output 51 remains at "0". Both inputs of the AND gate 48 and thus its output are at "1". The AND gate 52 thus has a "1" at both of its inputs and at its output, so that the counter 26 receives a counting pulse. The fewer pulses are counted by counter 26, the better is the measuring device.

$A > S_4$—unequivocal alpha signal

When the amplitude A of the detector signal 2 exceeds the threshold value $S_4$, the inverting output of the comparator 20 goes from "1" to "0", and the inverting output 50 of the memory 22 changes from "0" to "1". Since the threshold value $S_1$ has been exceeded, the first inputs of the AND gates 46, 51 and 52 are set to "1". Thus, the output of the AND gate 51 goes to "1" and the counter 24 counts an alpha pulse. The counters 25 and 26 receive no counting pulse since the second inputs of the AND gates 46 and 52, which are connected ahead of these counters, are at "0".

The positive pulse of the second monostable multivibrator 54 is thus used as the readout signal for the memories 21 and 22. During the time in which the output of the first monostable multivibrator 53 is at "1", time discrimination continues. The trailing edge of the pulse at the output of the second monostable multivibrator 54 terminates the readout process of the memories 21 and 22 and simultaneously sets the inverting output 56 of the bistable flip stage 55 and the first input of the NAND gate 57 to "1". If other input of the NAND gate 57, which is connected with the inverting output of the comparator 7, is also at "1", the output of the NAND gate 57 goes to "0". Thus, the bistable flip stages or memories 55, 31, 32, 21 and 22 are reset to a predetermined starting position and enabled for a new measurement.

The linkage of the output 56 of the bistable flip stage or memory 55 with the inverting output of the comparator 7 assures that the reset pulse is given to all bistable flip stages only if it is certain that the threshold value $S_1$ of the comparator 7 has not been exceeded, i.e., no detector signal 2 is on the line.

The pulse length of an alpha or beta pulse is about 150 ns, the time required for a measurement is about 1.2 us. Due to the statistical distribution of the pulses, one or several further pulses may occur during one measurement. Therefore, as soon as a measuring process has been actuated by setting of the bistable flip stage or memory 32, further alpha or beta pulses are suppressed by the circuit until, after the reset pulse, its availability for measurements has been re-established.

A prerequisite for accurate measurement is that the reset pulse must fall in time between two measuring signals so that the measuring device is ready to operate when a detector signal 2 arrives. Moreover, the linkages in the circuit arrangement assure that the time discrimination always begins with the rise of the leading edge of the detector signal 2.

A specific example of one embodiment of the circuit arrangement according to the invention ivention including, at least, the following specific values for the threshold values, i.e., $S_1 = 50$ mV, $S_2 = 150$ mV, $S_3 = 1.5$ V$\pm 10\%$, $S_4 = 2$ V$\pm 10\%$ and time periods $t_1 = 20$ ns, $t_2 \approx 100$ ns, and $t_3 = 30$ Ns, has an percent error of about 5%.

It will be understood that the above description of the present invention is susceptible to various modifications, changes and adaptations, and the same are intended to be comprehended within the meaning and range of equivalents of the appended claims.

What is claimed is:

1. Method for discriminating detector pulses generated in a detector by alpha and/or beta radiators, comprising the steps of:
   (a) detecting the alpha and/or beta radiation and producing detector pulses in response to detected radiation wherein the leading edges of said pulses rise, in a starting region of predetermined duration which lies in the nanosecond range, in a particle specific, almost constant manner and the pulses generated by alpha particles have a slope ($\beta$) which is substantially greater than the slope ($\beta$) of pulses generated by the beta particles;
   (b) establishing first, second, third and fourth predetermined successively increasing threshold values;
   (c) comparing the amplitude of each detector pulse to said first and second threshold values and counting each said pulse whose amplitude exceeds said first threshold value and does not reach said second threshold value as an unequivocal beta signal;
   (d) measuring the amplitude ($A_\alpha$, $A_\beta$) of each detector pulse which exceeds said second threshold value during a first predetermined constant time period ($t_1$) which lies in said region of almost constant rise ($\alpha$, $\beta$) of said leading edge (time discrimination); and
   (e) comparing the signal amplitudes ($A_\alpha$, $A_\beta$) of said detector pulses as measured by time discrimination during said step (d) with said third and fourth threshold values to effect the following associations of said detector pulses:
      (1) counting each measured pulse amplitude above said highest fourth threshold value as an unequivocal alpha signal;
      (2) counting each measured pulse amplitude above said second threshold value and below said third threshold as an unequivocal beta signal; and
      (3) separately counting each measured pulse amplitude above said third threshold value and below said fourth threshold value as an alpha or beta pulse which is evaluated as the quality which constitutes the error quota of said measurement.

2. A method as defined in claim 1, wherein:

said method further includes, prior to said step of measuring, delaying each detector pulse whose amplitude exceeds said second threshold by a period of time ($t_2$) which is determined by the time delays of the components required for signal processing;

said step of measuring includes stopping the rise of said leading edge of said detector pulse which begins after said delay period of time ($t_2$) after the expiration of said first predetermined constant time period ($t_1$) determining the said time discrimination;

said time ($t_1$) required for said time discrimination is predetermined by the trailing edge of a gating clock pulse whose duration ($t_3$), which lies in the nanosecond range, has been set such that the leading edge of said gating clock pulse lies immediately ahead of said rise of the detector pulse; and said method includes the following steps after said step of measuring and prior to said step of comparing the measured signal amplitudes with said third and fourth threshold values:

converting the measured signal voltage of said time discriminated detector pulse into the electrical charge of a capacitive memory; and integrating the charging and discharging curves of said capacitive memory to convert the peak-shaped maximum of the voltage amplitude of said detector pulse determined by said time discrimination into a maximum which is expanded in time.

3. A circuit arrangement for carrying out the method defined in claim 1, comprising in combination:

detector means for producing detector output pulses generated by alpha and/or beta radiators, wherein the leading edges of said pulses rise, in a starting region of predetermined duration which lies in the nanosecond range, in a particle specific, almost constant manner and with the pulses generated by alpha particles having a slope ($\alpha$) which is substantially greater than the slope ($\beta$) of pulses generated by beta particles;

a delay line means for delaying a detector pulse by a predetermined period of time ($t_2$) connected between the output of said detector means and an electronic switch means for interrupting the rise of the leading edge of a detector pulse in response to a control signal after a predetermined period of time ($t_1$) set to provide for time discrimination;

a first voltage comparator having said predetermined first threshold value and a second voltage comparator having said predetermined second threshold value, each said first and second comparator having its input connected to the output of said detector means and having an inverting and a noninverting output;

starter circuit means, connected via a digital delay member to said noninverting output of said first comparator and directly to said inverting output of said second comparator, and responsive to output signals from said comparators, for producing a trigger pulse to initiate said time discrimination only if the amplitude of a detector pulse exceeds said second threshold value;

a level equalizer circuit means, having its input connected to the output of said starter circuit means, for converting changes from "0" to "1" in its input signal into changes in voltage from 0 to $-5$ volt as its output signal;

gating clock pulse generator means, responsive to the output signal of said level equalizer circuit means, for generating a gating clock pulse of predetermined, constant pulse width ($t_3$) in the nanosecond range;

means for connecting the output of said gating clock pulse generator means to the control input of said electronic switch means for controlling the opening and closing of same;

pulse shaper means, connected to the output of said electronic switch means, for converting the signal voltage corresponding to the amplitude ($A_\alpha$, $A_\beta$) of the time-discriminated detector pulse appearing at the output of said switch means into an electrical charge and for expanding in time the peak-shaped maximum of said time-discriminated detector pulse;

circuit means for connecting the output of said pulse shaper means to the input of a third voltage comparator having said predetermined third threshold value and to the input of a fourth comparator having said predetermined fourth threshold value;

first and second memories connected to the inverting output of said third comparator, and to the inverting output of said fourth comparator, respectively;

an evaluation logic means, connected to the outputs of said first and second memories, for sorting the time and amplitude-discriminated detector pulses appearing at the outputs of said first and second memories into alpha signals, beta signals, and alpha or beta signals;

timing means, having its input connected to said inverting output of said first comparator and its output connected to said evaluation logic means, for producing a pulse at predetermined times which causes the transfer of a counting pulse to an associated one of a plurality of counters connected to said evaluation logic circuit means; and reset logic means, having a first input connected to said inverting output of said first comparator and a second input connected with the output of said timing means, for providing a reset pulse to its output, said output of said reset logic means being connected with the reset inputs of said first and second memories and to the reset inputs of a third memory contained in said reset logic means and a fourth and a fifth memory contained in said starter circuit means.

4. A circuit arrangement as defined in claim 3, wherein said starter circuit means includes:

a first NAND gate having a first input connected to the output of said digital delay member, a second input connected to said inverting output of said second comparator, and its output connected to the input of a first bistable flip stage which forms said fourth memory; and a second NAND gate having its first input connected to the noninverting output of said first flip stage, its second input connected with said noninverting output of said second comparator, and its output connected to the input of a second bistable flip stage, which forms said fifth memory, and whose inverting output is connected to the input of said level equalizer circuit means.

5. A circuit arrangement as defined in claim 3 or 4 wherein said level equalizer circuit means includes a pnp transistor whose base is connected to said input of said level equalizer circuit means, whose emitter is connected to a positive voltage of a few volts and whose collector is connected to a negative voltage corresponding to said positive voltage.

6. A circuit arrangement as defined in claim 3, wherein said gating clock pulse generator means comprises a third bistable flip stage having its input connected to the output of said level equalizer circuit means, its inverting output, which generates the leading edge of said gating clock pulse upon arrival of the trigger signal from said level equalizer circuit means, connected via a driver stage to the control electrode of said electronic switch means, and its noninverting output connected, via a delay member having a delay corresponding to said constant period of time ($t_3$), to its reset input, whereby the trailing edge of said gating clock pulse is produced at said inverting output of said third bistable flip stage when it is reset.

7. A circuit arrangement as defined in claim 6 wherein said electronic switch means comprises a field effect transistor having its gate connected to said inverting output of said third bistable flip stage and its source to drain path connected between the output of said delay line means and the input of said pulse shaper means, whereby said field effect transistor is opened by said leading edge of said gating clock pulse and closed by its trailing edge.

8. A circuit arrangement as defined in claim 3 wherein:
said first and second memories are each bistable flip stages with inverting and noninverting outputs;
said evaluation logic means includes first, second, third and fourth AND gates, each having first and second inputs and an output, said first AND gate having its said first input connected to said noninverting output of said first memory, said second AND gate having its said first input connected to said inverting output of said first memory and its said second input connected to said noninverting output of said second memory, said third AND gate having its said first input connected to said inverting output of said second memory, said fourth AND gate having its said first input connected to said output of said second AND gate, and said second inputs of each of said first, third, and fourth AND gates are connected to said output of said timing means; and
said circuit arrangement further includes a first counter, which counts the beta events, connected to said output of said first AND gate, a second counter which counts the alpha events, connected to said output of said third AND gate, and a third counter, which counts the alpha and beta events which cannot be unequivocally allocated to either said alpha counter or said beta counter, connected to said output of said fourth AND gate.

9. A circuit arrangement as defined in claim 3 wherein said timing means includes a first and second series-connected monostable multivibrators with said first monostable multivibrator having its input connected to said inverting output of said first comparator.

10. A circuit arrangement as defined in claim 3 wherein said reset logic means includes a further bistable flip stage, constituting said third memory, having its input connected to said output of said timing means, and its inverting output connected with the first input of a NAND gate whose second input is connected to said inverting output of said first comparator and whose output is said output of said reset logic means.

* * * * *